US009467595B2

(12) United States Patent
Lyren et al.

(10) Patent No.: US 9,467,595 B2
(45) Date of Patent: Oct. 11, 2016

(54) COVER FOR HANDHELD PORTABLE ELECTRONIC DEVICE

(71) Applicants: Philip Scott Lyren, Bangkok (TH); Glen A. Norris, Manila (PH)

(72) Inventors: Philip Scott Lyren, Bangkok (TH); Glen A. Norris, Manila (PH)

(*) Notice: Subject to any disclaimer, the term of this patent is extended or adjusted under 35 U.S.C. 154(b) by 561 days.

(21) Appl. No.: 13/864,453

(22) Filed: Apr. 17, 2013

(65) Prior Publication Data

US 2014/0313551 A1    Oct. 23, 2014

(51) Int. Cl.
| | |
|---|---|
| *G06F 3/00* | (2006.01) |
| *H04N 1/387* | (2006.01) |
| *G06F 3/0484* | (2013.01) |
| *H04N 1/00* | (2006.01) |
| *G06F 3/048* | (2013.01) |
| *G06F 3/0481* | (2013.01) |

(52) U.S. Cl.
CPC ............ *H04N 1/387* (2013.01); *G06F 3/0484* (2013.01); *H04N 1/0019* (2013.01); *H04N 1/00137* (2013.01); *H04N 1/00145* (2013.01); *H04N 1/00164* (2013.01); *H04N 1/00167* (2013.01); *H04N 1/00177* (2013.01); *H04N 1/00188* (2013.01); *G06F 3/048* (2013.01); *G06F 3/0481* (2013.01); *G06F 3/04815* (2013.01); *G06F 3/04842* (2013.01); *H04N 1/00307* (2013.01)

(58) Field of Classification Search
CPC .. G06F 3/048; G06F 3/0481; G06F 3/04815; G06F 3/0484; G06F 3/04842
See application file for complete search history.

(56) References Cited

U.S. PATENT DOCUMENTS

| | | | |
|---|---|---|---|
| 7,346,408 B2 * | 3/2008 | Van Bael et al. | 700/98 |
| 8,073,740 B1 * | 12/2011 | Siegel et al. | 705/26.1 |
| 2002/0085041 A1 * | 7/2002 | Ishikawa | 345/804 |
| 2004/0218238 A1 * | 11/2004 | Xie et al. | 359/3 |
| 2008/0233326 A1 * | 9/2008 | Hegemier et al. | 428/41.7 |
| 2008/0313552 A1 * | 12/2008 | Buehler et al. | 715/760 |
| 2009/0037802 A1 * | 2/2009 | Klier et al. | 715/202 |
| 2010/0148928 A1 * | 6/2010 | Yeager et al. | 340/10.1 |
| 2013/0057637 A1 * | 3/2013 | Sen et al. | 347/225 |
| 2013/0104080 A1 * | 4/2013 | Bosworth et al. | 715/838 |
| 2013/0159869 A1 * | 6/2013 | Faraji | 715/738 |
| 2013/0318476 A1 * | 11/2013 | Sauve et al. | 715/835 |
| 2015/0111623 A1 * | 4/2015 | Hegemier et al. | 455/575.1 |

\* cited by examiner

*Primary Examiner* — Kieu Vu
*Assistant Examiner* — Andrew Chung

(57) ABSTRACT

A method displays a template, an HPED, and an image selector. The template is marked with zones to display selected images, and the HPED includes a cover that has surfaces to display the selected images. The image selector displays images that when selected appear as the selected images on the zones of the template and on the surfaces of the cover. The template is printed with the selected images and folded into the cover that has a form factor of the HPED.

20 Claims, 14 Drawing Sheets

COVER FOR HANDHELD PORTABLE ELECTRONIC DEVICE

BACKGROUND

Smartphones, tablet computers, and other handheld portable electronic devices (HPEDs) are expensive. Users often place hard plastic covers on these devices to protect them from being scratched and damaged. The plastic covers are often placed on the devices for permanent use throughout the lifecycle of the devices.

SUMMARY OF THE INVENTION

Figure 1:
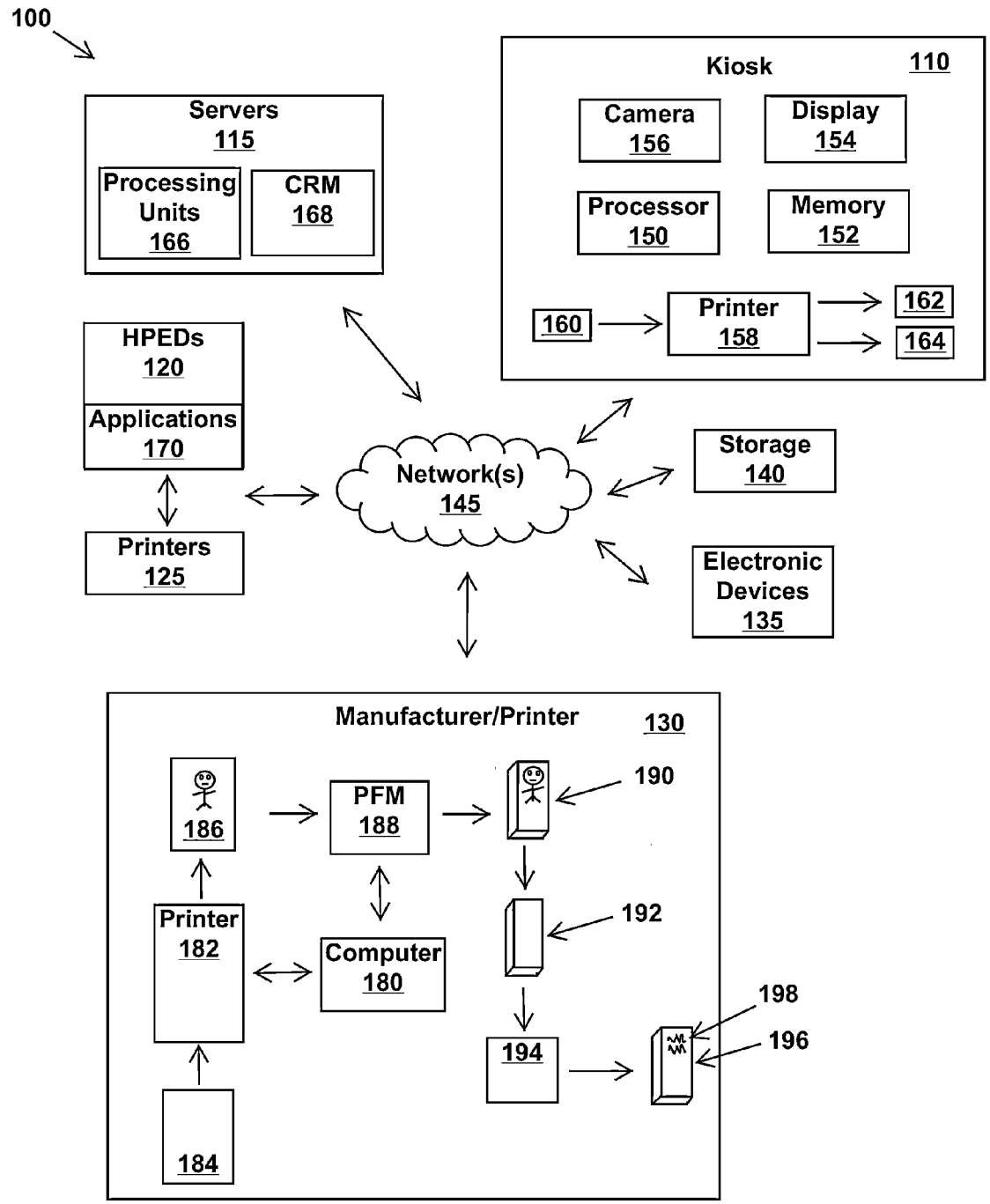
FIG. 1 is a computer system in accordance with an example embodiment.

One example embodiment is a method that displays a template, an HPED, and an image selector. The template is marked with zones to display selected images, and the HPED includes a cover that has surfaces to display the selected images. The image selector displays images that when selected appear as the selected images on the zones of the template and on the surfaces of the cover. The template is printed with the selected images and folded into the cover that has a form factor of the HPED.

DETAILED DESCRIPTION

Example embodiments include systems, apparatus, and methods related to a cover for a handheld portable electronic device (HPED). Users select designs and apply these selected designs to a cover in order to custom design the cover for HPEDs. The designs are printed on a foldable and printable material (such as paper) that is folded, shaped, and/or assembled into the cover for the HPED. The designs can also be printed on removable hard plastic covers that form an integrated part of a body of the HPED.

In an example embodiment, a computer system displays a user interface (UI) and/or a graphical user interface (GUI) that creates a foldable and printable cover for the HPED. The computer system simultaneously displays an image selector and an image of the HPED with a cover around the HPED. Alternatively, the image selector is simultaneously displayed with the cover and/or a template that folds and/or assembles to become the cover.

The computer system also provides a UI and/or GUI that creates custom designs on hard plastic covers, integrated cases, and displays or screens of HPEDs. The hard plastic covers and displays form part of the body of the HPED, such as forming front and back exterior surfaces of the HPED. Selected images are applied to the covers and/or displays with techniques such as laser etching and printing. For example, images of a user or images selected by a user are retrieved and permanently imprinted on the covers and/or displays.

An image selector enables users to select images that appear on different surfaces or zones of the cover. For example, a user can download photos to the cover, select from a library of predetermined photos and/or images, write text to the cover, add graphics to the cover, change colors of different surfaces of the cover, add backgrounds to the surfaces, and perform other designs to the surfaces of the cover. In this manner, users are able to custom design a cover for their HPED or select from many different predetermined designs.

Alternatively, the cover can be designed by a user agent of the user, a software application, an HPED, and/or an electronic device. This design is based on personal preferences and information in a user profile of the user. For instance, a user agent of a user consults a user profile of the user, determines favorite photographs of the user, and uploads these favorite photographs onto exterior surfaces of a cover for an HPED of the user. The user agent has the cover assembled and provided to the user.

In an example embodiment, the UI provides a two-dimensional or three-dimensional view of the HPED with a blank or white cover. The cover includes surfaces and/or zones that receive and display designs that are input from the user, user agent, HPED, software application, and/or an electronic device. For example, the user takes a picture with an HPED, and the picture immediately appears in real-time on one or more of the surfaces of an image of the cover. Subsequently, the cover is fabricated with the images on its surface. As another example, a user interacts with a display screen to draw on surfaces of the cover, such as drawing with a drawing tool or a finger of the user on the display. Additionally, the user can select images with the image selector and/or select images from a library of images to place on a surface of the cover. When an image is selected for placement on the cover, the image appears in real-time on the cover of an HPED being displayed on the display screen. As such, a user can view what the actual cover will look like during the design of the cover before the cover is produced.

In an example embodiment, once the cover is designed with the UI, the design is transferred to a template that represents the cover in an unassembled state. The template has different zones that correspond to the zones or surfaces of the cover. For example, if a user selects a series of photographs to appear on the cover, then these photographs are transferred to different locations on the template. The template can have one or more zones on a portion of its surfaces or include zones across all of its surfaces and/or surface area.

A printer then prints the template onto a pliable piece of material, such as paper or other medium. The template is folded and secured (such as being glued) into a cover that was represented by the cover that appeared on the UI of the computer system.

The design can be printed, folded, and assembled into the cover by the user or by a third party (such as by a manufacturer and/or a printer company). If the design is assembled by a third party, then the design is shipped to the user. The design can also be transmitted, stored, provided to the user, provided to a software application, provided to an electronic device, and/or provided to a third party.

Consider an example in which after the images are transferred to the template, the template is provided to the user (such as being emailed to the user, downloaded to the user, transmitted to the user, printed for the user, etc.). The user prints the template and then folds it into the cover. Alternatively, the template is transmitted to a manufacturer that assembles the cover and then provides it to the user (such as mailing or shipping the assembled cover to a shipping address designated by the user or another party).

Additionally, when the cover is assembled and sent to the user, it can be packaged to protect it from being damaged. For example, if the cover is made from paper, then it is assembled into a size and shape of the HPED and then the cover is placed around a protective insert. For instance, this protective insert has a size and shape of the HPED so the cover will not be compressed during shipping.

Alternatively, the cover can be formed from a foldable material that does not easily damage, such as being formed from TYVEK or other material. In this instance, the cover is assembled, compressed or flattened, placed in an envelope, and shipped to the user. A protective insert is not used since the cover will not damage when flattened and placed into an envelope.

In an example embodiment, the template has a pattern based on a selected HPED such that when the template is folded and/or assembled, it has a size and shape that emulates a size and shape of the HPED or emulates a portion of the size and the shape of the HPED. Different makes and models of HPEDs can have different sizes and shapes. A different template is provided for each of these different HPEDs. Furthermore, different templates can be provided for a same HPED.

Consider an example in which company ABC manufactures a line of smartphones that have different sizes and/or shapes. Each one of these smartphones has one or more templates associated with the smartphone. For instance, smartphone model XYZ has two different templates associated with the smartphone. Each template offers a different style of cover for this smartphone. For instance, one template covers fives sides of the smartphone and includes a transparent window through which a display on the smartphone is visible while it is enclosed in the cover. Another template covers six sides of the smartphone and includes a movable flap that covers the display on the smartphone while it is enclosed in the cover.

In an example embodiment, the cover snuggly fits over the outer surface of the HPED and provides a protective covering or enclosure. This covering can cover portions of the outer surface area of the HPED or all of the outer surface area of the HPED (such as cover 40%, 50%, 60%, 70%, 80%, 90%, or 100% of a total outer surface area of the HPED). Alternatively, the cover can form portions of the body of the HPED, such as forming a back cover and/or front cover. For instance, the front and back covers are included in the original HPED sold to consumers.

In example embodiments, users are thus able to design custom and/or unique covers since their designs are formed and/or printed on the outer and inner surfaces of the cover. The users are also able to select from different types or styles of covers for their HPED.

FIG. 1 is a computer system 100 that includes a kiosk 110, servers 115, HPEDs 120 in communication with printers 125, a manufacturer or printer 130, electronic devices 135, and storage 140. One or more elements in the computer system 100 can communicate with each other through one or more networks 145. Blocks and/or methods discussed herein are executed with the computer system and/or elements within the computer system.

The kiosk 110 is a small enclosure or structure that is used to sell merchandise, such as covers for HPEDs. The kiosk 110 includes a processor 150 that communicates with a memory 152, a display 154, a camera 156, and a printer 158. Some kiosks are booths or enclosures that receive payment for rendering a service and/or producing a product.

In an example embodiment, the display 154 provides a user interface (UI) or graphical user interface (GUI) that enables a user to interact with the kiosk to design custom covers for HPEDs. The camera takes pictures of the user, and these pictures are then transferred to a template. The printer 158 prints the template on a foldable medium 160 to produce a printed template 162. The printed template is customized since it includes the selected pictures and includes instructions that describe with words and/or pictures how to fold the template into a size and shape of a cover for the HPED. Alternatively, the kiosk can perform a series of fold and adhesive operations on the printed template 162 to generate an assembled cover 164 for the user.

The servers 115 include processing units 166 that communicate with computer readable medium (CRM) 168 to execute operations and tasks that implement or assist in implementing example embodiments. By way of example, the servers 115 include hardware and/or software that are dedicated to run a service for custom designing and/or fabricating a cover for HPEDs. For example, the servers provide productivity and/or information retrieval for mobile applications that execute on HPEDs and electronic devices.

For instance, HPEDs 120 include and execute one or more mobile software applications 170 that are available through and/or downloaded from an application distribution platform, such as an online store hosted by the servers 115. The applications 170 can function alone and/or communicate with the servers 115 to custom design a cover for HPEDs and/or execute blocks and/or methods discussed herein.

The HPEDs 120 can be connected to and/or in communication with one or more printers 125 that print designs and pictures on the templates and/or covers. These printers 125 include cloud printers that enable users to send print jobs over the web or Internet to remotely located printers. Examples of these printers include, but are not limited to, ink-jet, toner laser, cutting laser, thermal, 3D, and dot matrix.

The manufacturer and/or printer 130 prints templates and/or manufacturers covers according to job requests. Users, user agents, software applications, and/or HPEDs send jobs over the networks 145 to the manufacturer that processes and completes the jobs for the requestor. The jobs include designing a custom template and/or cover, printing a template and/or cover, folding and/or assembling a template into a cover, shipping assembled and/or printed covers in various stages of assembly to shipping addresses, and executing methods and/or blocks discussed herein.

In an example embodiment, a computer 180 at the manufacturer 130 receives a job to print and assemble a custom cover for an HPED and/or user. The computer 180 designs or retrieves a layout of pictures for the cover. For example, the job request includes a template with a custom layout of unique pictures, patterns, and text. As another example, the computer designs the layout for the user based on a user profile of the user. The computer 180 instructs a printer 182 to print the layout on foldable and printable material 184, such as paper. This layout appears on the printed material 186 in the form of a printed template that is sent to a paper-folding machine (PFM) 188. This machine is in communication with the computer 180 and folds the printed material into a cover 190 for the HPED.

Production of the cover includes, but is not limited to, printing, cutting, folding, assembling, adhering, attaching, and stitching. By way of example, once the cover 190 is folded and assembled together (e.g., using glue or an adhesive to secure the folds), the cover can be shipped to a shipping address. Alternatively, the cover can be shipped at different stages of assembly or production. For example, a specialty material is precut, scored, and then mailed to a user for custom printing and/or final assembly.

The cover can be made of a material that can be compressed without damaging the structure of the cover (such as being made from TYVEK or other material). In this instance, the cover is compressed, inserted into an envelope, and shipped and/or mailed. Alternatively, the cover can be made of a material that cannot be compressed or further folded without damaging the structure of the cover (such as being made of paper that shows creases or folds when compressed or folded). In this instance, a protective insert 192 is inserted into an opening of the cover. This insert 192 has a shape and size of the HPED that the cover 190 is designed to enclose. The insert 192 is made from an inexpensive, lightweight material (such as being made from recycled cardboard). Shipping paper or an envelope 194 is then placed around the cover 190 and insert 192 to produce an assembled product ready for shipping 196. This assembly 196 includes a shipping address 198 on an exterior surface.

In an example embodiment, the cover 190, the insert 192, and the HPED have an equivalent or an approximately equivalent size and shape. The cover 190 is slightly larger than the insert 192 and the HPED so that the cover can snugly and firmly fit on and around the insert 192 and the HPED. A size and shape and/or form factor of the insert 192 thus emulates the size and shape and/or form factor of the HPED. Furthermore, a size and shape and/or form factor of the assembled package 198 is equivalent or approximately equivalent to a size and shape and/or form factor of the HPED positioned inside of the cover 190. The assembled package 198 is slightly larger than the HPED with the cover by an amount roughly equal to a thickness of the envelope 194.

The electronic devices 135 include, but are not limited to, kiosks, HPEDs, electronic devices with cellular or mobile phone capabilities, digital cameras, desktop computers, servers, portable computers (such as tablet and notebook computers), handheld audio playing devices (example, handheld devices for downloading and playing music and videos), personal digital assistants (PDAs), combinations of these devices, and other portable and non-portable electronic devices and systems. An example of an electronic device and/or server also appears in FIG. 13.

The networks 145 can include one or more of the internet, an intranet, an extranet, a cellular network, a local area network (LAN), a home area network (HAN), metropolitan area network (MAN), a wide area network (WAN), public and private networks, etc.

The storage 140 can include various types of storage that include, but are not limited to, magnetic storage and optical storage, such as hard disks, magnetic tape, disk cartridges, universal serial bus (USB) flash memory, compact disk read-only memory (CD-ROM), digital video disk read-only memory (DVD-ROM), CD-recordable memory, CD-rewritable memory, photoCD, and web-based storage. Storage can include storage pools that are hosted by third parties, such as an operator of a data center. The HPEDs, electronic devices, computers, and/or servers can use the storage to store files, software applications, data objects, etc. Storage can be accessed through a web service application programming interface, a web-based user interface, or other mechanisms.

Figure 2:
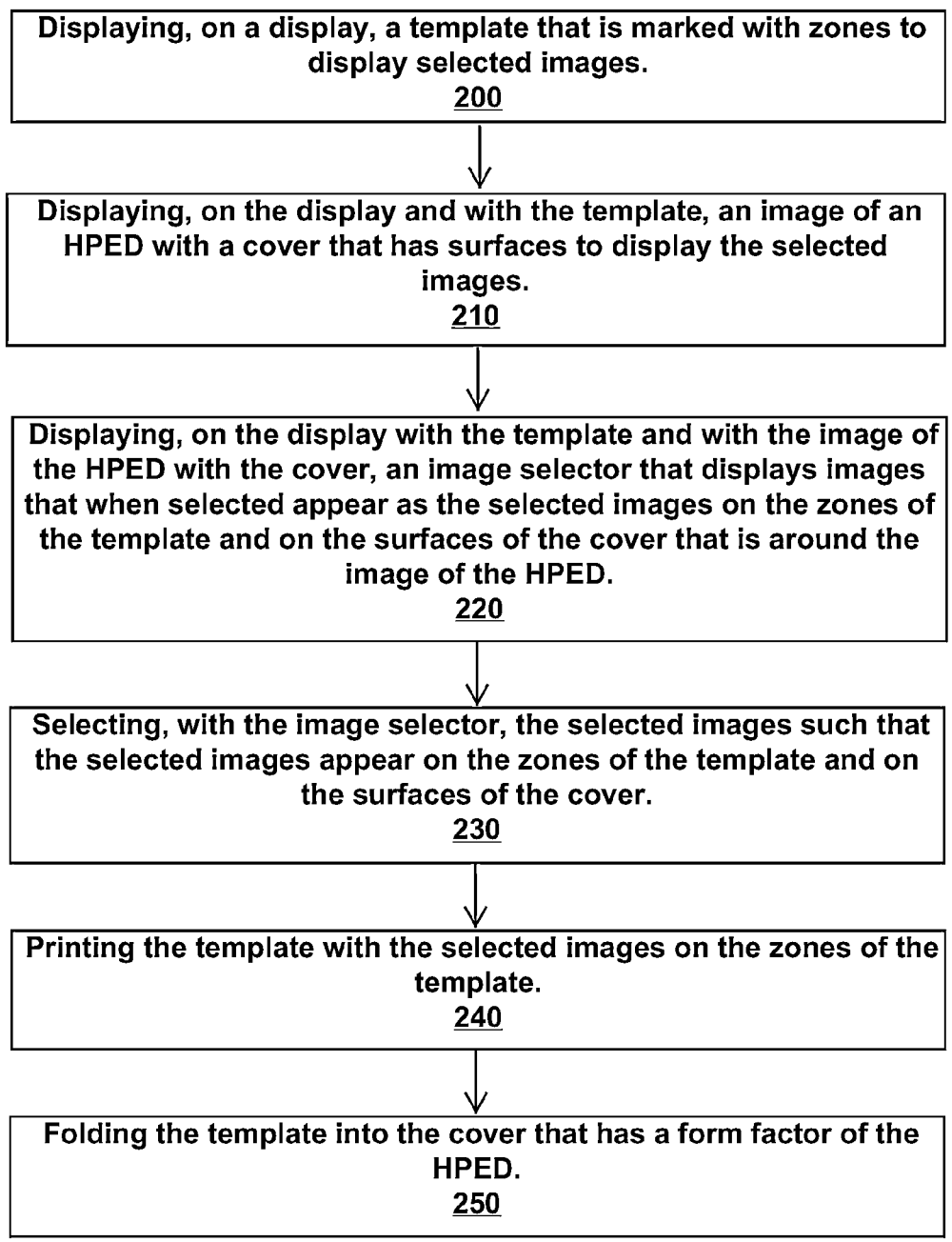
FIG. 2 is a method executed by a computer system to create a cover for an HPED in accordance with an example embodiment.

FIG. 2 is a method executed by a computer system to create a cover for an HPED.

Block 200 states displaying, on a display, a template that is marked with zones to display selected images.

Consider an example in which the template is displayed on a display of an electronic device and is provided with visible zones that signify locations where selected images appear. These zones mark boundaries that provide locations on the template where the selected images appear. For example, the zones appear as areas on the template that are distinguished from each other and/or from non-zoned areas. Techniques to mark the zones and to provide this distinction include, but are not limited to, using different colors, lines (such as dashed lines, dotted lines, or dark lines), shades, hatching (including cross-hatching), visible patterns, symbols, indicia, text, and images.

Block 210 states displaying, on the display and with the template, an image of the HPED with a cover that has surfaces to display the selected images. The HPED can be displayed with or without the cover on the HPED.

Consider an example in which the HPED has a rectangular configuration with six different sides or surfaces (a front surface, a back surface, two side surfaces, and two end surfaces). One or more of these surfaces can receive and display the selected images. For example, if the cover fits around five of the different sides, then the cover can have images on these five different sides. As another example, the cover forms part of the HPED, such as including the display screen of the HPED.

Block 220 states displaying, on the display with the template and with the image of the HPED with the cover, an image selector that displays images that when selected appear as the selected images on the zones of the template and on the surfaces of the cover that is around the image of the HPED.

Consider an example in which the image selector is a software tool that provides and/or displays images that can be selected for printing on the cover. The image selector can visually display these images on the display and/or provide a mechanism to retrieve the images. For instance, images are downloaded or uploaded to the electronic device, appear in the image selector, and then provided to the zones of the template, the cover, and the surfaces of the image of the HPED.

Block 230 states selecting, with the image selector, the selected images such that the selected images appear on the zones of the template and on the surfaces of the cover.

Consider an example in which the image selector assists in transferring selected images to the zones of the template, to the cover, and/or to the surfaces of the image of the HPED. For example, the image selector receives images and then automatically transfers the received images to the zones of the template, to the cover, and/or to the surfaces of the HPED. As another example, the image selector displays photographs taken with the HPED or with another electronic device. A user selects one or more these photographs, and the selected photographs appear on the zones of the template, the cover, and/or surfaces of the HPED. As another example, the image selector includes a library of images, such as pictures, geometric shapes, art work, drawings, logos, colors, backgrounds, posters, quotes/sayings, labels, numbers, text, signs, insignia, objects, etc. A user, user agent, software application, or electronic device selects one or more of these to place on the zones of the template, the covers, and/or surfaces of the HPED.

Block 240 states printing the template with the selected images on the zones of the template.

Consider an example in which the template is printed on a piece of paper with a printer, such as an impact printer (e.g., a dot-matrix printer) or a non-impact printer (e.g., a laser printer or an inkjet printer).

Block 250 states folding the template into the cover that has a form factor of the HPED.

Consider an example in which the template is folded at plural different locations in order to form a cover that has a size and shape of the HPED. The HPED removably inserts or fits into the cover. For instance, if the HPED is shaped like a rectangular prism, then the cover also has the shape of this rectangular prism. The cover has a slightly larger size than a size of the HPED. This difference in size enables the cover to snugly fit around the HPED but also allows the HPED to be inserted into and removed from the cover.

Figure 3:
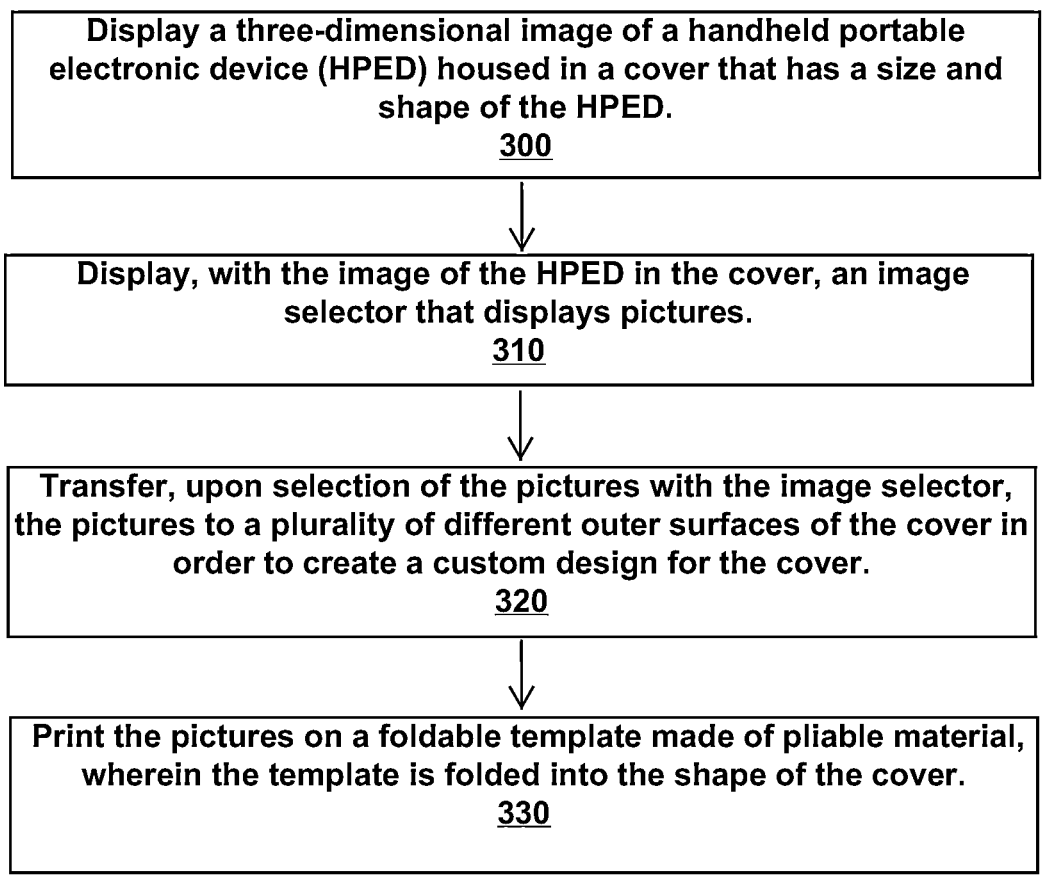
FIG. 3 is a method to create and print a custom design for a cover that covers an HPED in accordance with an example embodiment.

FIG. 3 is a method to create and print a custom design for a cover that covers an HPED.

Block 300 states display a three-dimensional image of a handheld portable electronic device (HPED) housed in a cover that has a size and shape of the HPED.

Consider an example in which a display of an electronic device displays a three-dimensional image of an HPED that includes a cover. The cover has a size and shape of the HPED in order to surround and cover an exterior surface of the HPED. For example, if the HPED has a size and shape of a particular model smartphone, then the cover also has this size and shape of the smartphone. The cover is slightly larger than the HPED to enable the cover to fit over and around all or a portion of the exterior surface of the HPED.

Block 310 states display, with the image of the HPED in the cover, an image selector that displays pictures.

Consider an example in which the image selector is a software tool and/or graphical user interface (GUI) that enables a user to select pictures that when selected appear on outer surfaces of the cover while the cover is around the HPED. The image selector simultaneously displays plural different pictures that can be selected to appear on the outer surfaces of the cover. For example, a user drags-and-drops a picture displayed at the image selector to a location on the cover in order to place the selected picture on the cover. As another example, the user clicks on a picture and on an outer surface of the cover to designate this outer surface as the location for the picture. As another example, a user provides a command that selects a picture and that selects a location on the cover to receive and display the selected picture. Such a command can come from the user providing a voice command and/or interacting with a keyboard, a display, or an electronic device.

Block 320 states transfer, upon selection of the pictures with the image selector, the pictures to a plurality of different outer surfaces of the cover in order to create a custom design for the cover.

Consider an example in which the image selector receives a plurality of pictures from a user, such as pictures taken with the HPED or with another electronic device. The image selector selects one or more of these pictures and places them at different locations on the cover. For example, a user agent of the user places the pictures according to a hierarchy, such as placing a first favorite picture at a first location, placing a second favorite picture at a second location, etc. As another example, pictures are placed at predetermined or default locations, such as placing a pictures of the user at a first location, pictures of friends of the user at a second location, and other pictures at a third location.

Block 330 states print the pictures on a foldable template made of pliable material, wherein the template is folded into the shape of the cover.

Consider an example in which a user selects pictures and designates locations for these pictures on the cover of the HPED. The pictures include images, symbols, and text that the user selects. These pictures are printed onto the template, and the template is folded into the shape of the cover. This shape emulates the shape of the HPED such that the cover fits over and around a portion of the HPED.

Figure 4:
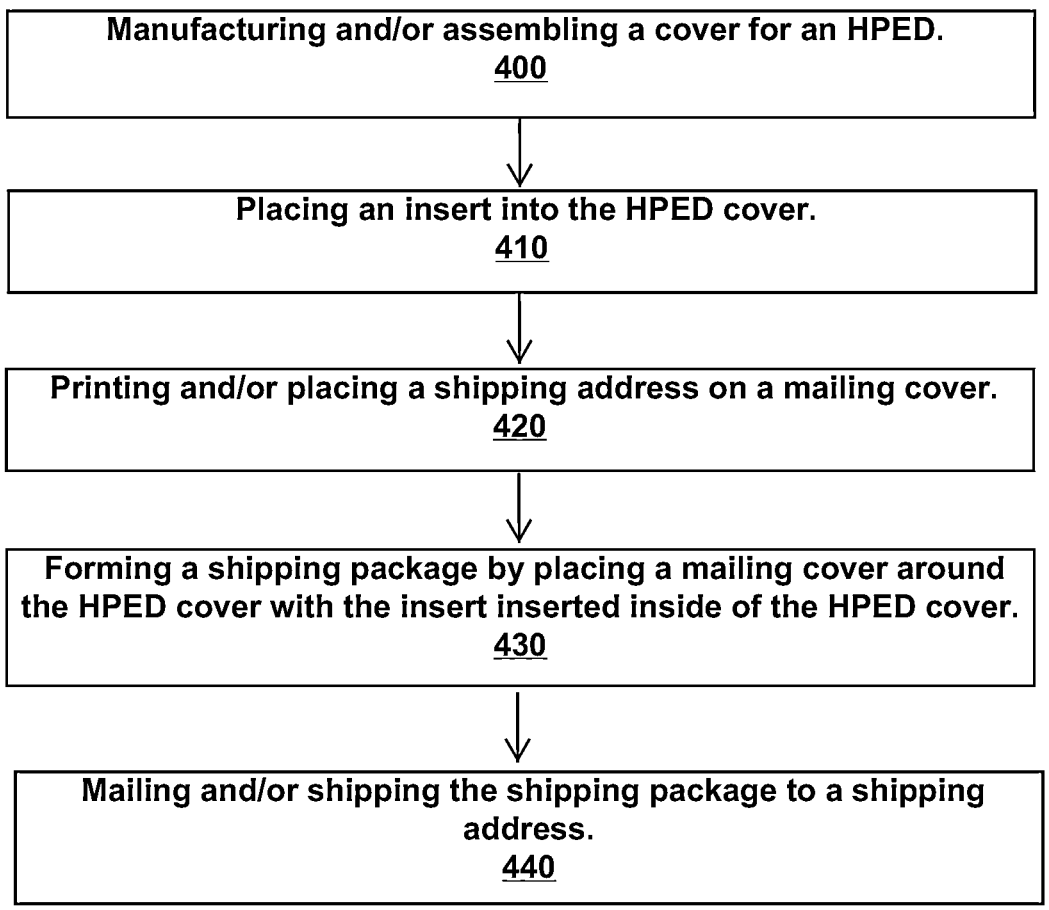
FIG. 4 is a method to ship a cover for an HPED in accordance with an example embodiment.

FIG. 4 is a method to ship a cover for an HPED.

Block 400 states manufacturing and/or assembling a cover for an HPED. For example, an order for the cover is received and then the cover is printed, folded, glued, and assembled into the HPED cover.

Block 410 states placing an insert into the HPED cover. The insert has a size and shape of the HPED that will be inserted into the cover. For example, if the cover is made for a tablet computer, then the insert is sized and shaped as the tablet computer. If the cover is made for a smartphone, then the insert is sized and shape as the smartphone.

The insert protects the HPED cover from being damaged during shipping. For example, if the HPED cover is made from paper or another lightweight pliable material, then the HPED cover can be easily smashed or bent. The HPED cover fits snugly around the insert and prevents the HPED cover from being smashed, bent, torn, or otherwise damaged.

Preferably, the insert is formed from a material that is one or more of strong, lightweight, inexpensive, recyclable, and readily available. Examples of this material include, but are not limited to, cardboard, paper, expanded polystyrene foam, plastic, and combinations of these materials.

Consider an example in which an order is received for an HPED cover that will fit over an IPHONE 5. A size and shape of this smartphone is retrieved, and the insert is fabricated to emulate the size and shape of this smartphone. In other words, the insert has a form factor of the smartphone that will be inserted into the cover.

Block 420 states printing and/or placing a shipping address on a mailing cover. For example, the mailing cover is a piece of shipping paper or an envelope.

Block 430 states forming a shipping package by placing a mailing cover around the HPED cover with the insert inserted inside of the HPED cover. The mailing cover can fit snugly around the exterior surface of the HPED cover and insert such that the shipping package has a size and shape of the HPED.

Consider an example in which a user orders an HPED cover for a smartphone model ABC. The HPED cover is made for this smartphone, and the insert (sized and shaped to emulate the smartphone ABC) is inserted into the HPED cover. A paper mailing cover with a shipping address is then wrapped around the HPED cover. Since the mailing cover is made of a thin material (paper in this example), the overall shape and size of the HPED cover does not substantially change. For example, the HPED cover approximately increases in size by the thickness of the mailing cover. As such, the assembled shipping package has a form factor that emulates the form factor of the smartphone for which the HPED cover is made.

Block 440 states mailing and/or shipping the shipping package to a shipping address. For example, the shipping address is printed or placed on an exterior surface of the shipping package.

In an example embodiment, the template, cover, and/or container are made from a pliable material that can be folded, printed, and shaped into a form factor and/or size and shape of an HPED. Examples of this material include, but are not limited to, paper, flashspun high-density polyethylene fibers (such as TYVEK), plastic, cloth, fabric, polymers, and combinations of these items. Examples of paper include, but are not limited to, book paper, card stock, Manila paper, bond paper, bank paper, cardboard, coated paper, cotton paper, inkjet paper, laid paper, kraft paper, wove paper, waterproof paper, TYVEK paper, waterproof paper, xuan paper, paperboard, recycled paper, hologram paper, glow-in-the-dark paper, and washi paper. Furthermore, some types of paper can have different weights, such as twenty pound (20 lb), twenty-four pound (24 lb), thirty-two pound (32 lb), and sixty-eight pound or cover stock (68 lb).

In an example embodiment, the template and shipping package exist on and/or are formed with a single piece of material. For instance, the shipping package and the template are located on a same piece of material. In other words, the shipping package and the template co-exist on a same physical piece of material. In this embodiment, a single printing process imprints the customized template, the assembly instructions, and the shipping address on a single sheet of material. Subsequently, the template is partially cut and/or partially folded without severing it from excess material located adjacent the template. This excess material is folded around the template to form a shipping package and/or folded into an appropriate dummy insert shape. In this embodiment, the recipient has a single seam to cut to release the template and/or HPED cover from the packaging and/or dummy protective insert.

Figure 5:
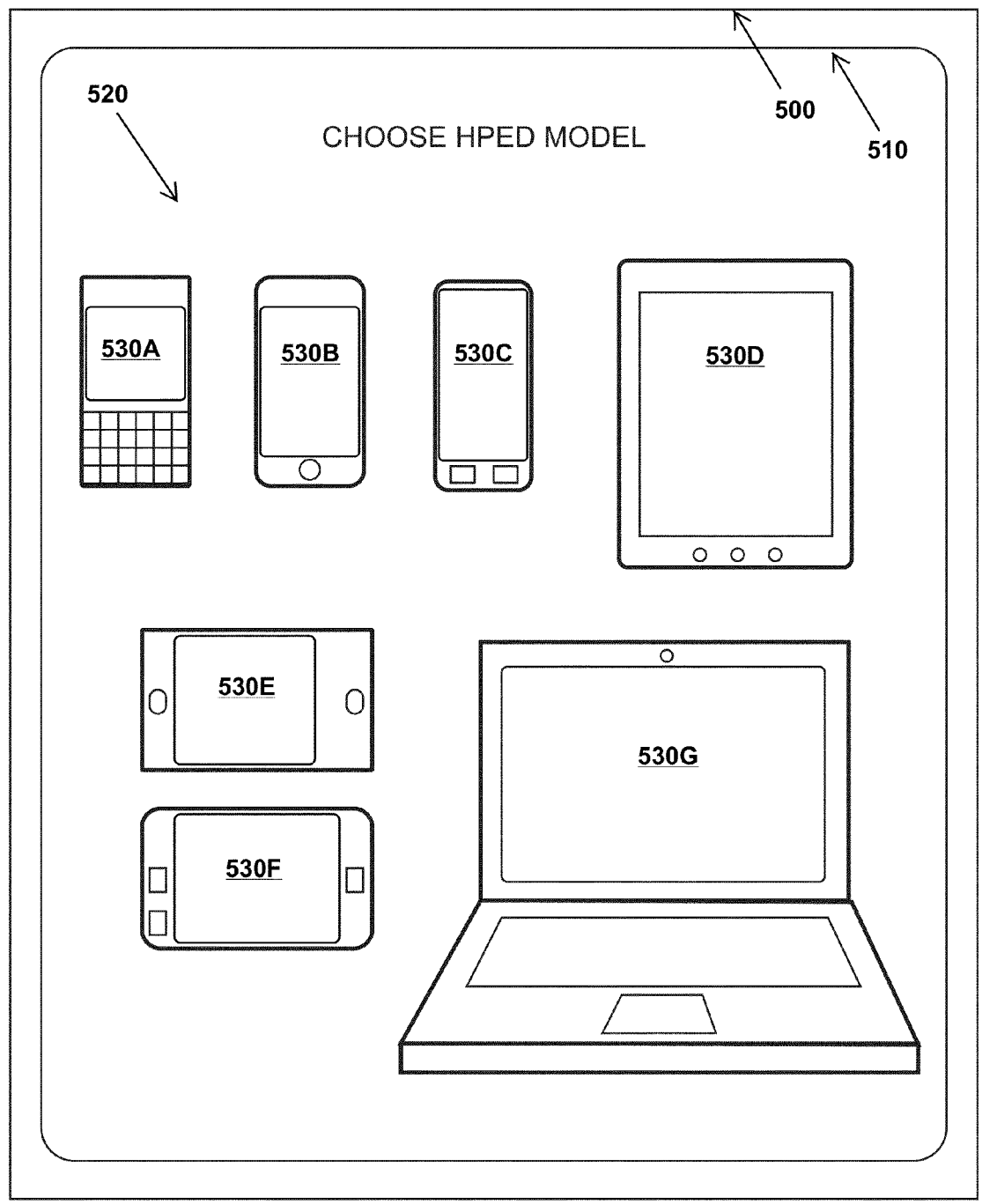
FIG. 5 is an electronic device with a display that shows a graphical user interface for selecting an HPED for which a cover is designed in accordance with an example embodiment.

FIG. 5 is an electronic device 500 with a display 510 that shows a graphical user interface (GUI) 520 for selecting an HPED for which a cover is designed in accordance with an example embodiment. For illustration, the GUI 520 shows seven different types of makes and/or models of HPEDs 530A, 530B, 530C, 530D, 530E, 530F, and 530G. A selection is made of one of these HPEDs in order to determine a corresponding template and/or cover to design for the selected HPED.

Consider an example in which a user owns a tablet computer, a notebook computer, and a smartphone. The user decides to custom design a removable cover for one of these electronic devices. At the beginning of the design process, an electronic device depicts on its display each of the users devices (such as depicting a picture of the tablet computer, the notebook computer, and the smartphone). The user selects one of these electronic devices to indicate for which device the user intends to design a cover.

After completing a design layout for one electronic device, the design layout can be translated to a different template for a different device. This allows the user to use a same or similar design layout on different HPEDs. This process saves time since the user does not design a same or similar design layout twice.

Template designs can be saved and stored with a unique name provided to the user so that the user or anyone who knows the unique name may load the customized template at any time and/or request additional production. For example, a template is created by one friend, further customized by another friend, and then printed by the first friend. The customized template can be edited or altered and saved again, or it may be saved as a static read-only template. For example, a designer creates a custom template and shares its unique name so other users can print, but not alter, the template.

Consider an example in which a user wants to design a template and share or sell this template, but the user wants to have one or more specific zones that are locked such that other users cannot change a design in the specific zone. For instance, a promoter custom designs one or more specific zones of a template (such as the front face) with a logo of the promoter. These specific zones are locked and saved as read-only zones (i.e., the zones can be read but not written to, deleted, and/or altered). The promoter then sells and/or distributes the template to other users. These other users can customize other zones of the template, but cannot alter the specific zone customized by the promoter. Furthermore, because images may be confidential, template designs can be encrypted prior to storage and decrypted after retrieval with a password provided by the user.

Consider another example in which a user decides to design a cover for an HPED. HPEDs with different sizes and shapes are fit with covers that have correspondingly different sizes and shapes. The user interacts with a UI to instruct for which make and model the user desires a cover. The cover and/or template corresponding to this make and model is retrieved so the user can begin to design a customized cover for the HPED.

A selection of an HPED and corresponding template and/or cover can also occur automatically and/or with a default determination. For example, a default is set such that a template and/or cover are retrieved for the HPED making the request. For instance, if a user uses a mobile application on a smartphone to design a cover for the smartphone, then a default is to retrieve a template and/or cover having a size and shape corresponding to the smartphone being used to customize the template.

The computer system, printer, and interface discussed herein can also be used to custom design and print other things that can be created by cutting, folding, and/or assembling a pliable material from a template. Some examples include, but are not limited to, a wallet, a gift envelope, a booklet, an information pamphlet, a party hat, a hand-thrown glider, animal figurines, vehicle figurines, playing cards, greeting cards, and origami figures.

Figure 6:
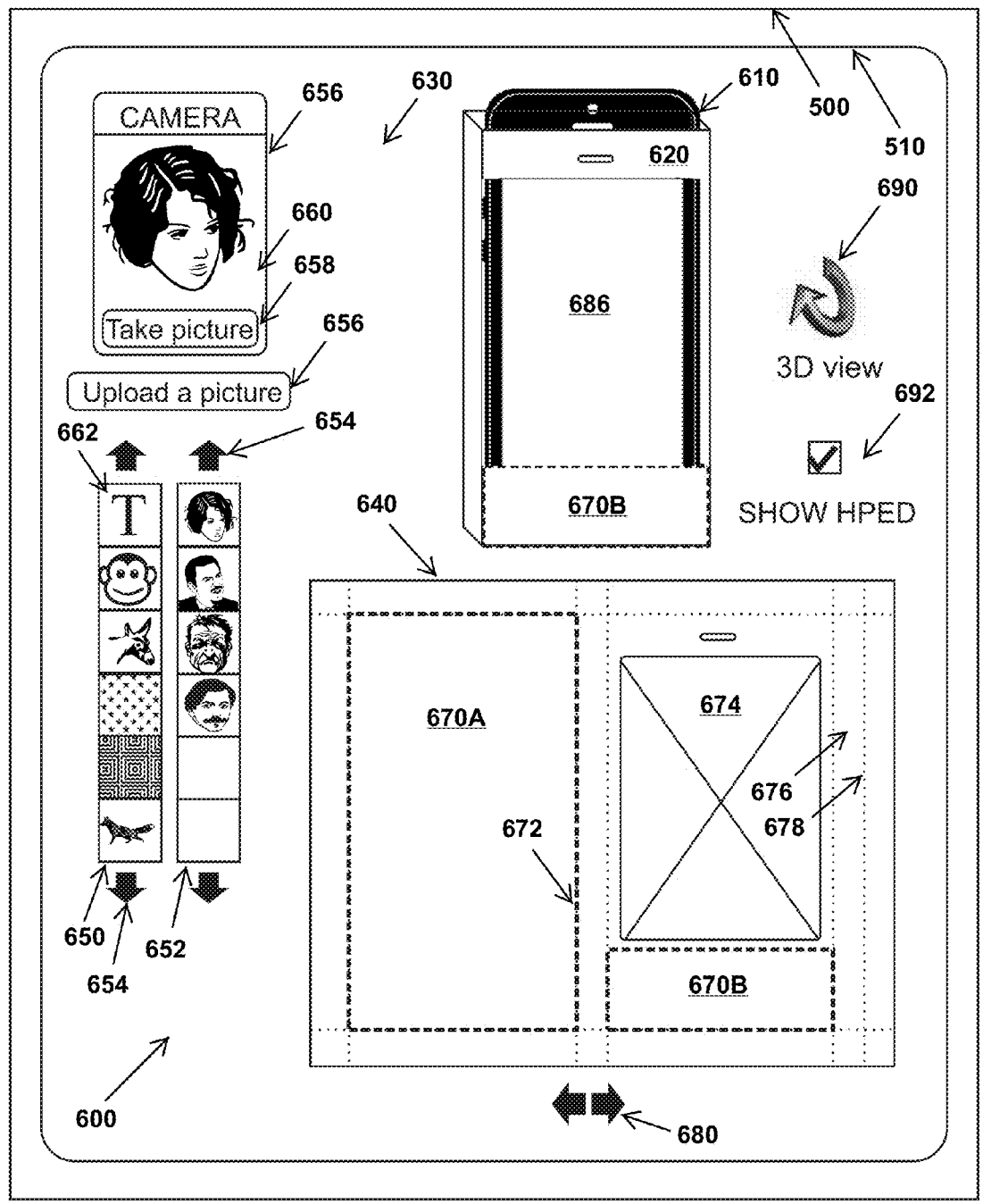
FIG. 6 is the electronic device of FIG. 5 with the display that shows a graphical user interface for designing a cover for the selected HPED in accordance with an example embodiment.

FIG. 6 is the electronic device of FIG. 5 with the display that shows a graphical user interface 600 for designing a cover for the selected HPED in accordance with an example embodiment.

The GUI 600 includes an image of the HPED 610, a cover 620 fitted over the HPED 610, an image selector 630, and a template 640. These items are simultaneously displayed on the display 510 of the electronic device 500 in order to assist the user in designing a customized cover for the HPED.

The image selector 630 enables a user to select images that will appear on the cover and/or on the template. By way of example, the image selector 630 includes two columns of images. A first column 650 includes images from a library, and a second column 652 includes custom and/or unique user images.

The images from the library in column 650 and the custom and/or unique user images in column 652 include pictures, artwork, designs, backgrounds, text, logos, etc. that the user can select to appear on the cover and/or template. Arrows 654 at a top and bottom of columns 650 and 652 enable a user to scroll upward or downward through the images.

The image selector 630 also enables the user to upload pictures that are placed on the cover 620 and/or template 640. The user can upload images that appear in the second column 652 with an upload selector 656 (shown as "Upload a picture"). Activation of this selector 656 enables a user to navigate to a location to select and upload an image, such as a saved picture. For example, activation of the selector 656 navigates the user to a cloud storage location or to a folder with pictures or attempts to initiate a wireless picture file transmission, such as a transmission that uses Bluetooth, WiFi, or another transmission technology.

Once the images are uploaded, they are displayed in the second column 652 for selection.

Additionally, the electronic device 500 includes a camera that displays a real-time image 656 on the display 510. The image selector 630 includes a selector 658 (shown as "Take Picture") that enables a user to take a picture with the camera and then immediately have this picture displayed in the second column 652 and/or on the template and/or cover. A current view of the camera is shown in real-time at an image location 660 such that this image location reveals what the camera sees. The image shown in image location 660 also appears as the first image at the top of column 652. This signifies that the user took a picture of a face of a woman, and this picture appears as a selectable image in column 652.

Column 650 of the image selector 630 also includes a text selector 662 that enables users to type text onto the cover 620 and/or template 640. For example, upon selection of the text selector 662, a user clicks or points to a zone or area on the cover and/or template and a text box or text window appears at this location. Thus, a user can type text into a zone or area outside of a zone. If an image is already placed in the zone, then the text superimposes over the image.

In an example embodiment, users can select a hierarchy of superimposition. For example, a default position is that text is superimposed over backgrounds. When multiple images and/or text overlap, then the interface allows the user to select the hierarchy of superimposition.

The interface allows the user to select the font, size, and color of the text, as well as text styles and graphic effects, such as 3D, embossed appearance, textured letters, etc. The user may choose to let the software automatically size and color the text so that it fits in the zone and stands out visually from the image or background color. The interface also allows the user to drag images or text from a zone to any other zone or arbitrary position on any view, and to arbitrarily scale, arbitrarily rotate, and/or arbitrarily stretch the images and/or text. Furthermore, the interface allows the user to remove text and/or images placed on a template.

The template 640 is displayed as a flat and/or two-dimensional image with a plurality of zones 670A and 670B where images occur. These zones are marked or distinguished with an identifying feature, such as showing the zones with heavy dashed lines 672. The zones can be visually distinguished in other ways as well, such as using different colors, backgrounds, lines, shadings, symbols, etc. For example, a common color on a zone of the template and a zone of the image of the HPED indicates that the zone of the template and the zone of the image of the HPED correspond to each other. The template 640 also includes one or more locations outside of the zones, such as window 674 and area 676. These locations represent areas where images do not occur. For instance, an image does not occur at window 674 since this area is cut out. Additionally, an image does not occur at area 676 since this area has fold lines 678 that represent where the template is folded. Thus, a user can readily distinguish between locations where an image can be placed and locations where an image is not placed.

Arrows 680 appear adjacent the template 640 and enable a user to scroll or navigate to different faces of the template, such as changing from operating on a front view of the template to operating on a back view of the template.

After the template is folded and/or assembled, it forms a cover 620 for the HPED 610. The GUI 600 shows the HPED 610 inside the cover 620. This cover 620 is formed from the template 640 after the template is folded and/or assembled. The cover 620 includes areas and/or zones that correspond to the areas and/or zones shown on the template. For example, the template 640 and the cover 620 show zone 670B. Thus, zone 670B on the template corresponds to a front surface of the cover.

Since the HPED 610 is inserted into the cover 620 and displayed on the GUI 600, a user can readily visualize what the HPED will look like after the cover is placed on the HPED. In other words, while the template 640 and/or cover 620 are being designed, a user can see how the cover will look before being produced and how the HPED will look with the cover on the HPED.

The HPED 610 includes a display 686 that is not enclosed by the cover 620. The window 674 cutout or removed from the template fits over the display 686 so a user can view and interact with the display while the HPED is in the cover.

The HPED 610 and cover 620 are shown as three-dimensional (3D) images on the GUI 600. A selector 690 (shown with an arrow and labeled "3D view") enables a user to rotate the 3D image of the cover and HPED. Activation of this selector 690 enables a user to rotate the cover and HPED about three axes (the X-axis, the Y-axis, and the Z-axis) in order to view it from any angle.

The GUI 600 also includes a selector 692 (shown with a box and labeled "SHOW HPED") that enables a user to show the cover 620 with or without picturing the HPED 610 as encased. For example, when the box of the selector 692 is checked (such as shown in FIG. 6), then the cover 620 is displayed fitted in position around the HPED 610. When the when the box of the selector 692 is not checked (such as shown in FIG. 7), then the cover 620 is displayed without the HPED 610.

Figure 7:
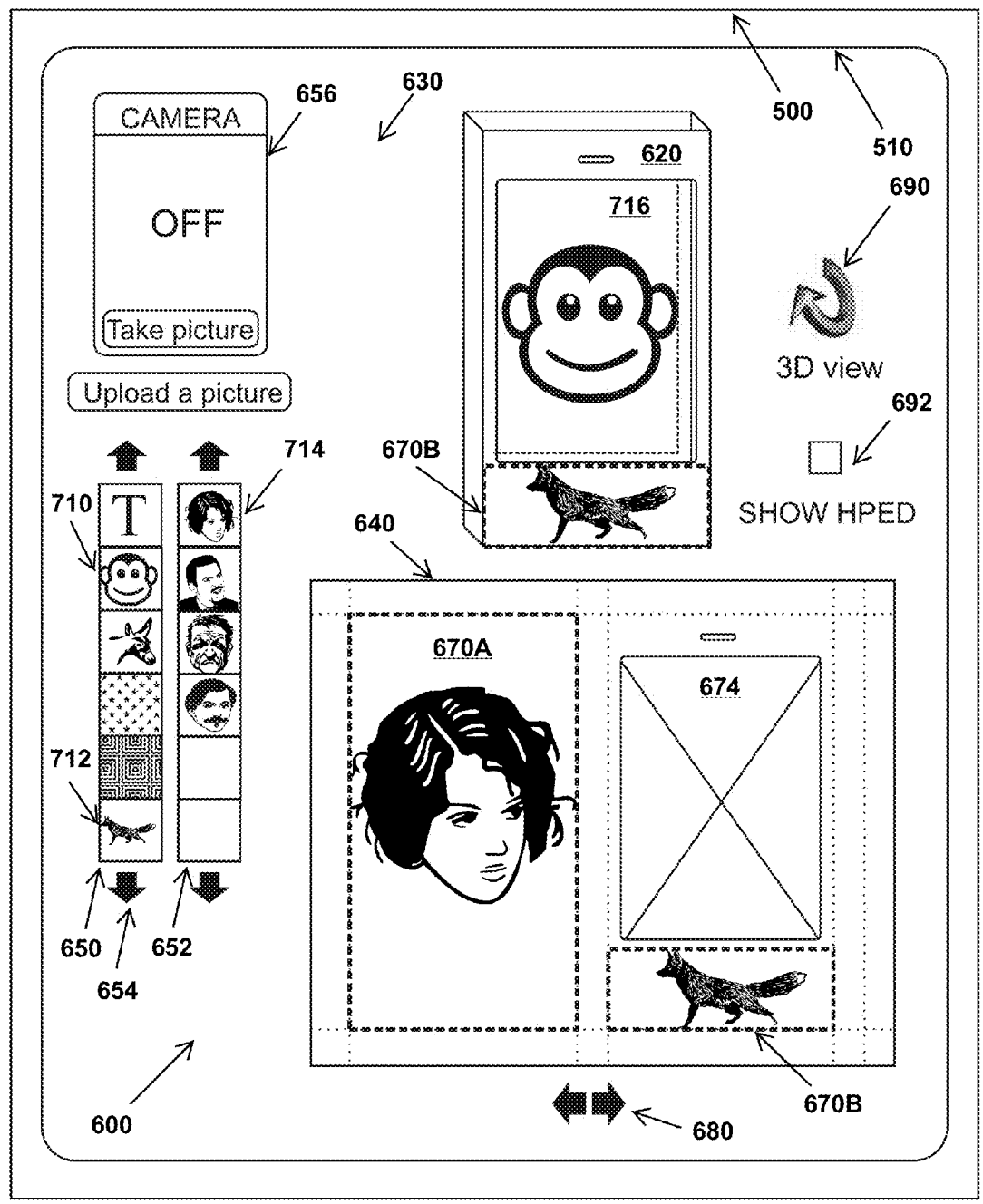
FIG. 7 is the electronic device of FIG. 5 with the display that shows the graphical user interface of FIG. 6 for designing the cover for the selected HPED in accordance with an example embodiment.

FIG. 7 is the electronic device 500 with the display 510 that shows the GUI 600 of FIG. 6 for designing the cover 620 for the selected HPED in accordance with an example embodiment.

FIG. 7 shows the HPED (shown in FIG. 6 at 610) as being removed from the cover 620 since the box of selector 692 is unchecked. Further, images in columns 650 and 652 have been applied to the template 640 and/or cover 620. For instance, an image 710 (shown as a face of a monkey), an image 712 (shown as a fox), and an image 714 (shown as a woman) appear as images on the template and on the cover. The image of the monkey 710 appears in zone 716 of the cover 620. This image would also appear on a corresponding zone of the template, such as being shown on the back-side of the template after activation of arrows 680. The image of the fox 712 appears in zone 670B of the cover 620 and template 640. The image of the woman 714 appears in zone 670A of the template 640. This image would also appear on a corresponding zone of the cover, such as being shown on the back-side of the cover after activation of the arrow in selector 690.

Different types of operations can be used to move and/or transfer images to the cover 620 and/or template 640. These operations include, but are not limited to, dragging-and-dropping images, clicking images, locations, and/or zones, using voice commands, using pull-down menus, using pointing devices, interacting with the display, etc. Additionally, images can be automatically transferred to zones of the template and/or cover. For instance, when an image is captured with the HPED or with the electronic device, the image automatically transfers to one of the zones. As another example, images that are emailed or uploaded to a social network are automatically applied to the image selector and/or zones.

In an example embodiment, when an image is selected and/or transferred to a zone of the template and/or cover, the image appears on both surfaces and is automatically scaled to fit to the size and shape of the selected zone. An image can be dragged to any template view or any assembled view. Further, an image can be dragged from the picture menu or from its prior placement in another view. By way of example, when the image is selected and transferred to a zone, the image "snaps" into position and is automatically sized to fit within the frame without changing the aspect ratio. The selected image appears in corresponding frames of other template views and/or assembled views and/or the 3D view. After placement of the image, the interface allows the image to be rotated, scaled, moved, or stretched (changing the aspect ratio) within the frame. Additionally, an image placed on a frame or page which is already occupied will replace the image.

Consider an example in which a user selects the image of fox 712 at the image selector 630. The user clicks on the image of fox 712 and then clicks on zone 670B on template 640. The image of the fox 712 automatically scales to appear in zone 670B on both the template 640 and the cover 620. Consider another example in which the user drags the image of the fox 712 from the image selector 630 to the zone 670B on the cover 620. The image of the fox 712 automatically appears in zone 670B on both the template 640 and the cover 620.

Figure 8:
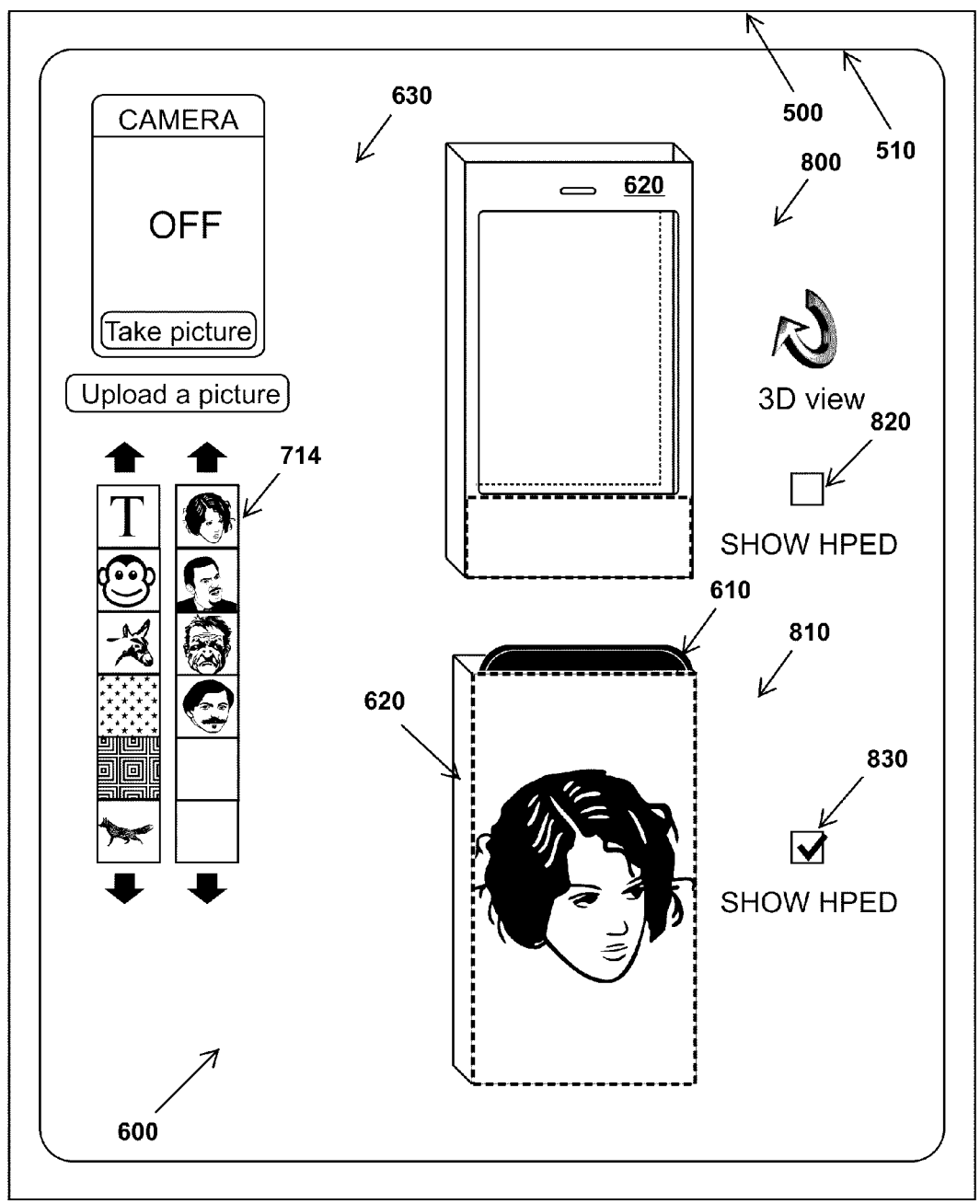
FIG. 8 is the electronic device of FIG. 5 with the display that shows a graphical user interface for designing the cover for the selected HPED in accordance with an example embodiment.

FIG. 8 is the electronic device 500 with the display 510 that shows the graphical user interface 600 for designing the cover 620 for the selected HPED 610 in accordance with an example embodiment.

The GUI 600 in FIG. 8 simultaneously shows the HPED 610, the cover 620, and the image selector 630 (the template is not displayed in this example embodiment). A first view 800 of the cover 620 shows the cover without the HPED 610, while a second view 810 of the cover 620 shows the cover enclosing or housing the HPED 610. The HPED 610 is removed from view 800 since the box 820 is unchecked, while the HPED 610 appears in view 810 since the box 830 is checked.

As shown in FIG. 8, the HPED 610 and the cover 620 are shown as 3D images on the GUI 600. These 3D images enable a user to visualize what the customized cover will look like on the HPED during the design of the cover. While the cover is being designed, the cover is shown on the selected make and model HPED for which the cover is being designed.

Consider an example in which a user selects an IPHONE 6 as the make and model of a smartphone. The image of this smartphone is then retrieved and presented on the display to the user. A template and/or cover shaped and sized to fit this smartphone is also retrieved and presented on the display to the user. Thus, the user sees images of the actual product and the actual cover as the cover is being designed. This enables the user to see what the smartphone will look like in the cover during the design process.

Figure 9:
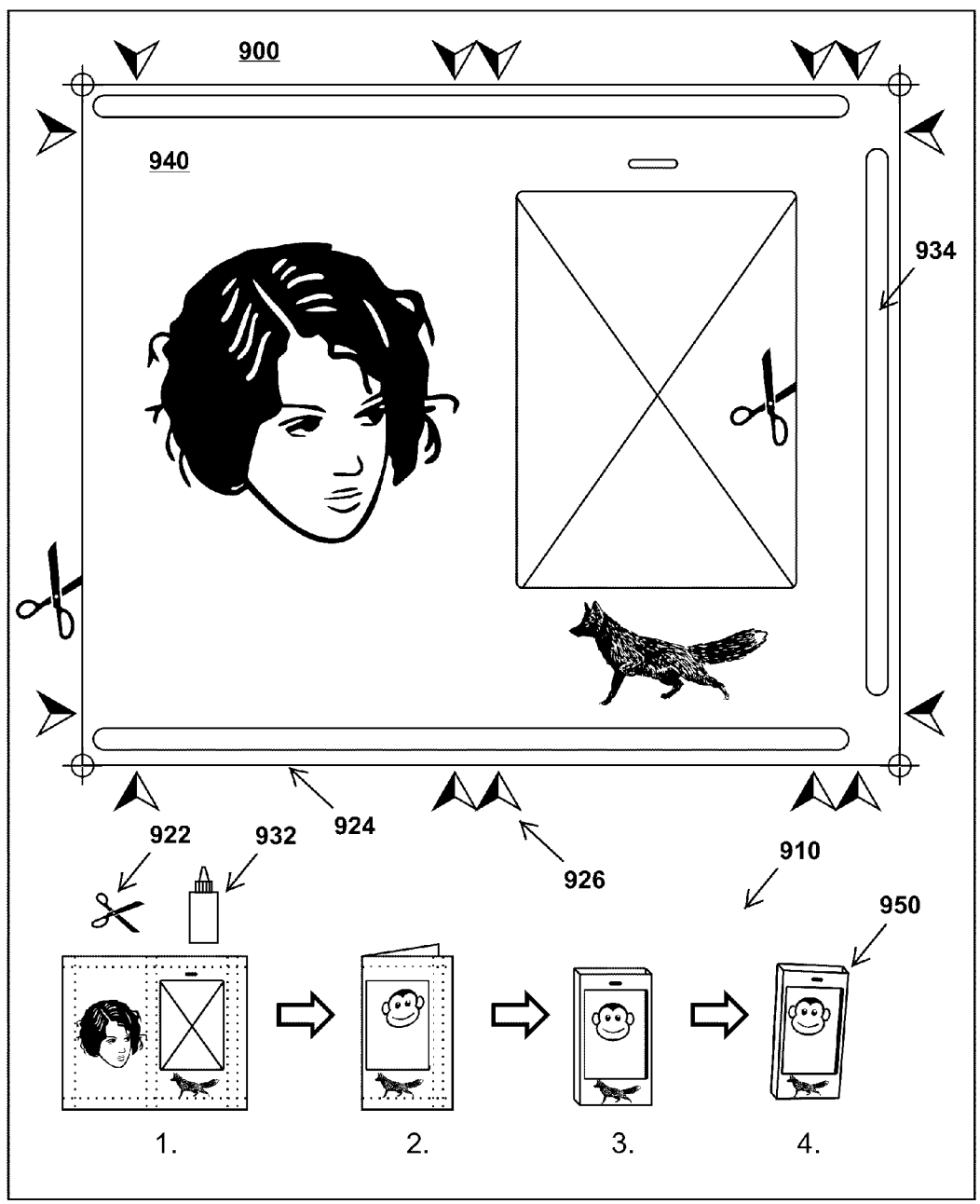
FIG. 9 is a template with instructions showing how to fold and cut the template into the cover for the HPED in accordance with an example embodiment.

FIG. 9 is a template 900 with instructions 910 showing how to fold and cut the template into the cover for the HPED in accordance with an example embodiment. The template and the instructions are printed on one or more surfaces of a foldable material.

The template 900 includes indications where to cut the material. For example, these indications are shown as images of scissors 922, cut lines 924, and arrows 926 that point to the fold lines. The template also includes indications where to place an adhesive. For example, these indications are shown as an image of a glue bottle 932 and strips or areas 934 that show where to apply the glue.

The instructions 910 include four steps that visually show how to cut out the unassembled cover 940 and then fold and glue this cover into the shape of the assembled cover 950 (shown in step 4). Furthermore, the instructions 910 and the unassembled cover 940 integrate the customizations made to the template up to that point.

The template can be updated and/or changed, such as providing new and/or different templates for new and/or different makes and model HPEDs, updating graphics for assembled and 3D views, and updating and/or changing locations or sizes or shapes of zones.

FIGS. 6-8 show a GUI 600 that includes images of one or more of the HPED 610, the cover 620, the image selector 630, and the template 640. The elements can be simultaneously displayed on a GUI, or one or more of these elements can be displayed together. For example, the display of the electronic device designing the cover and/or HPED may be small and/or not well-suited to display all of these elements together. As another example, the electronic device can include a mobile software application that assists in designing the cover and/or HPED, and this mobile application can include a series of GUIs to assist in the design. FIGS. 10A, 10B, 10C, and 11 show examples of one or more of these elements being displayed.

Figure 10A:
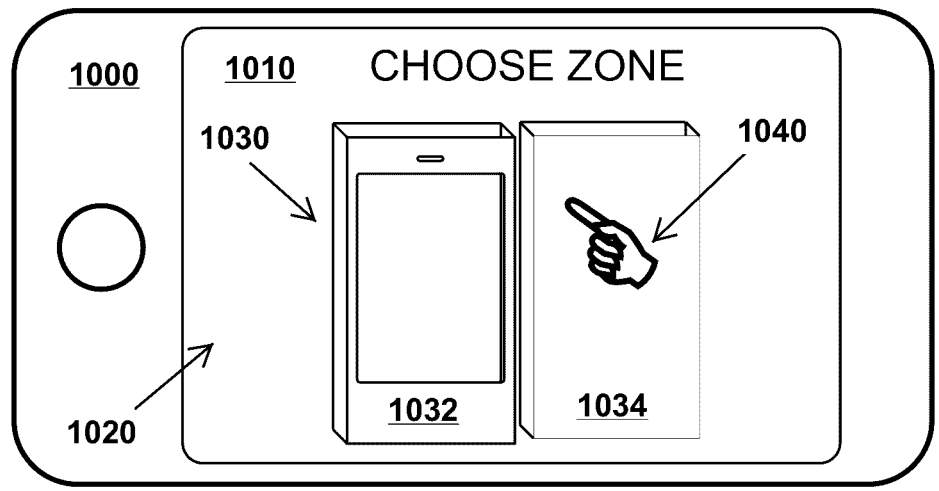
FIG. 10A is an electronic device with a display that shows a graphical user interface for choosing a zone to design a cover for an HPED in accordance with an example embodiment.

FIG. 10A is an electronic device 1000 with a display 1010 that shows a graphical user interface 1020 for choosing a zone to design a cover 1030 for an HPED. The GUI 1020 includes a three-dimensional image of a front-side 1032 of the cover 1030 and a back-side 1034 of the cover 1030.

In an example embodiment, the HPED is the electronic device 1000. In other words, the GUI assists in designing a custom cover for the electronic device displaying the GUI.

In FIG. 10A, a user uses a pointing device 1040 to select a zone or area on the back-side 1034 of the cover where an image will appear. The cover can have predefined zones or areas that can receive an image. In this instance, a user clicks on a zone to indicate that this zone will receive an image. Additionally, any zone or area of the cover can receive an image. For example, a user can draw or specify boundaries for the zone or area where an image will be placed. For instance, a user uses the pointing device 1040 to draw a zone on the cover with user-drawn shape, such as drawing a circle, a square, a rectangle, or any other type of shape to receive an image. A selected image is then automatically scaled to fit into the user-drawn zone.

Figure 10B:
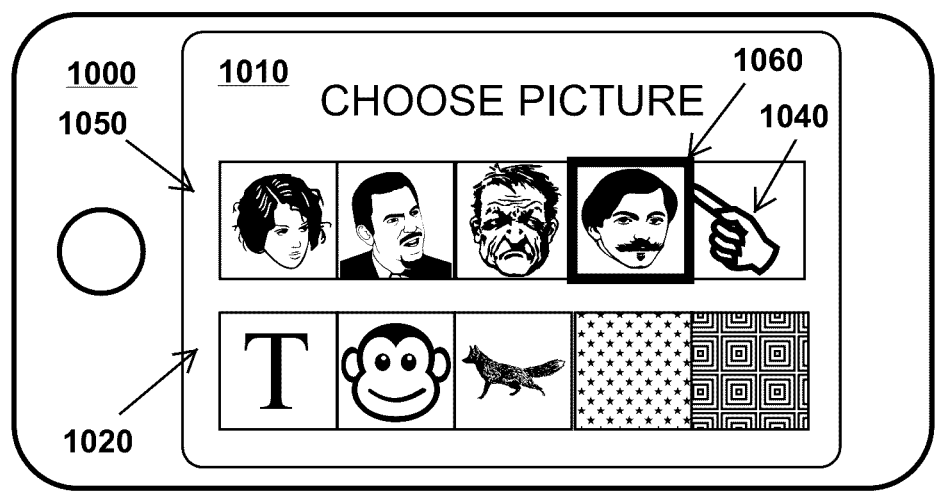
FIG. 10B is the electronic device of FIG. 10A with the display that shows the graphical user interface for choosing a picture to design the cover for the HPED in accordance with an example embodiment.

FIG. 10B is the electronic device 1000 of FIG. 10A with the display 1010 that shows the graphical user interface 1020 for choosing a picture. The GUI includes an image selector 1050 that displays images that are selectable to appear in the selected zone. A selected picture is placed into the zone or area selected per FIG. 10A.

By way of example, FIG. 10B shows the pointing device 1040 choosing or selecting a picture 1060 (shown as a face of a man) to appear in the selected zone. When the picture 1060 is selected it automatically appears in the selected zone of the cover.

Figure 10C:
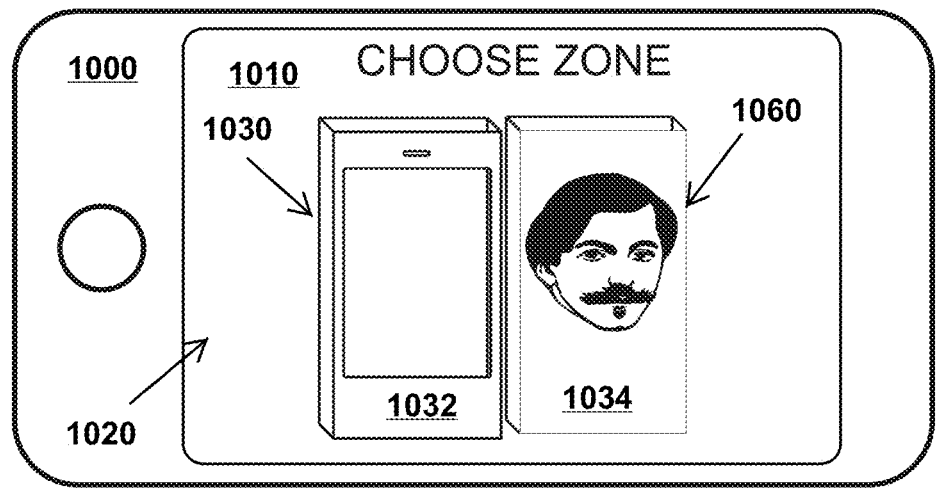
FIG. 10C is the electronic device of FIG. 10A with the display that shows the graphical user interface for choosing a zone to design the cover for the HPED in accordance with an example embodiment.

FIG. 10C is the electronic device 1000 of FIG. 10A with the display 1010 that shows the graphical user interface 1020 for choosing a zone to design the cover 1030 for the HPED. The back-side 1034 of the cover 1030 includes the image 1060 selected per FIG. 10B. The user can continue to select another zone and/or area to receive another image.

Figure 11:
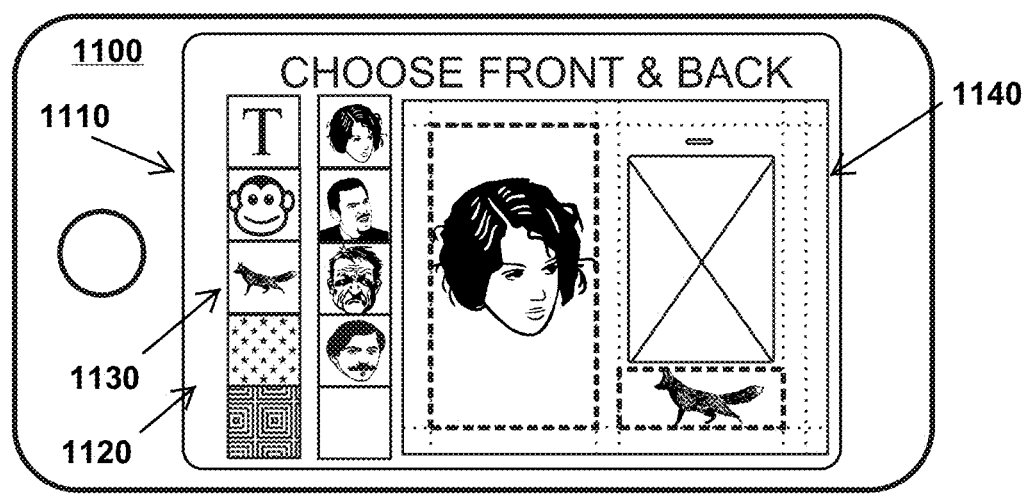
FIG. 11 is an electronic device with a display that shows a graphical user interface for designing a cover for an HPED in accordance with an example embodiment.

FIG. 11 is an electronic device 1100 with a display 1110 that shows a graphical user interface 1120 for designing a cover for an HPED in accordance with an example embodiment. The GUI 1120 displays an image selector 1130 and a template or unassembled cover 1140 for the HPED.

In order to design the cover, the user interacts with the image selector 1130 and template or unassembled cover 1140 to select zones and/or areas and images to appear in the selected zones and/or areas.

Example embodiments provide apparatus, methods, and systems to design and/or assist in designing covers for electronic devices. By way of example, these covers can be separate from the electronic device, such as being aftermarket products that fit on and/or around all or a portion of the electronic device. An example of such a cover includes a protective case or enclosure into which the electronic device is positioned after the electronic device is sold to a user. This cover is an accessory to the electronic device and may or may not be manufactured by the manufacturer of the electronic device.

As another example, these covers can also include a portion of a body of the electronic device. For example, a cover can include a front-side or front-body that forms part of the originally manufactured electronic device. As another example, the cover can include a back-side or back-body that forms an integrated part of the electronic device. These covers (also called cases) can be manufactured by the manufacturer and form the product sold to the user or consumer. Furthermore, these covers include the screen and/or display and are often made from hard-plastic, silicone, polymers, metal, and/or glass. Such covers serve to house and to protect internal electronic components and to provide aesthetic appeal to the electronic device.

As yet another example, these covers can also include replacement parts or components for the electronic device. For example, a body of an electronic device is manufactured with a glass front cover that functions as a display and with a hard plastic back-cover that connects to the front-cover and encloses the internal electronic components. The manufacturer of the electronic device or another manufacturer produces and sells front-covers and back-covers that replace the original covers provided on the electronic device. As such, users can replace and/or swap covers on their HPEDs.

Consider an example in which an HPED has an exterior body that is formed having a rectangular configuration. This rectangular configuration includes a front-cover that includes a touch screen. This front-cover connects to a back-cover to house electronic components (such as a memory, processor, camera, power manager, battery, communication, user interface, sensors, etc.). Example embodiments include custom designing these covers to include images selected by the user, user agent, HPED, and/or software application.

Figure 12A:
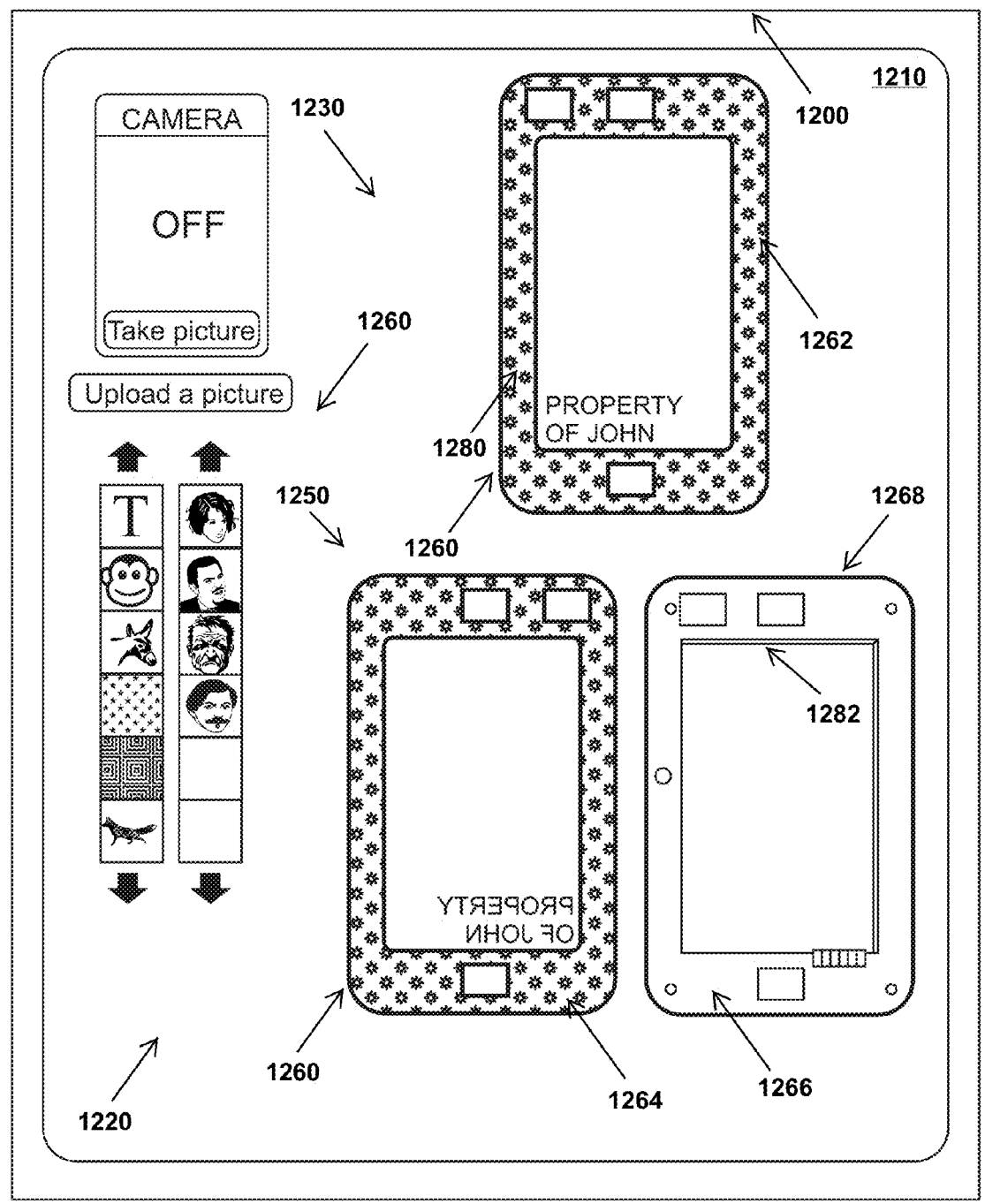
FIG. 12A is an electronic device with a display that shows a graphical user interface for designing a front-side of a body of an HPED in accordance with an example embodiment.
Figure 12B:
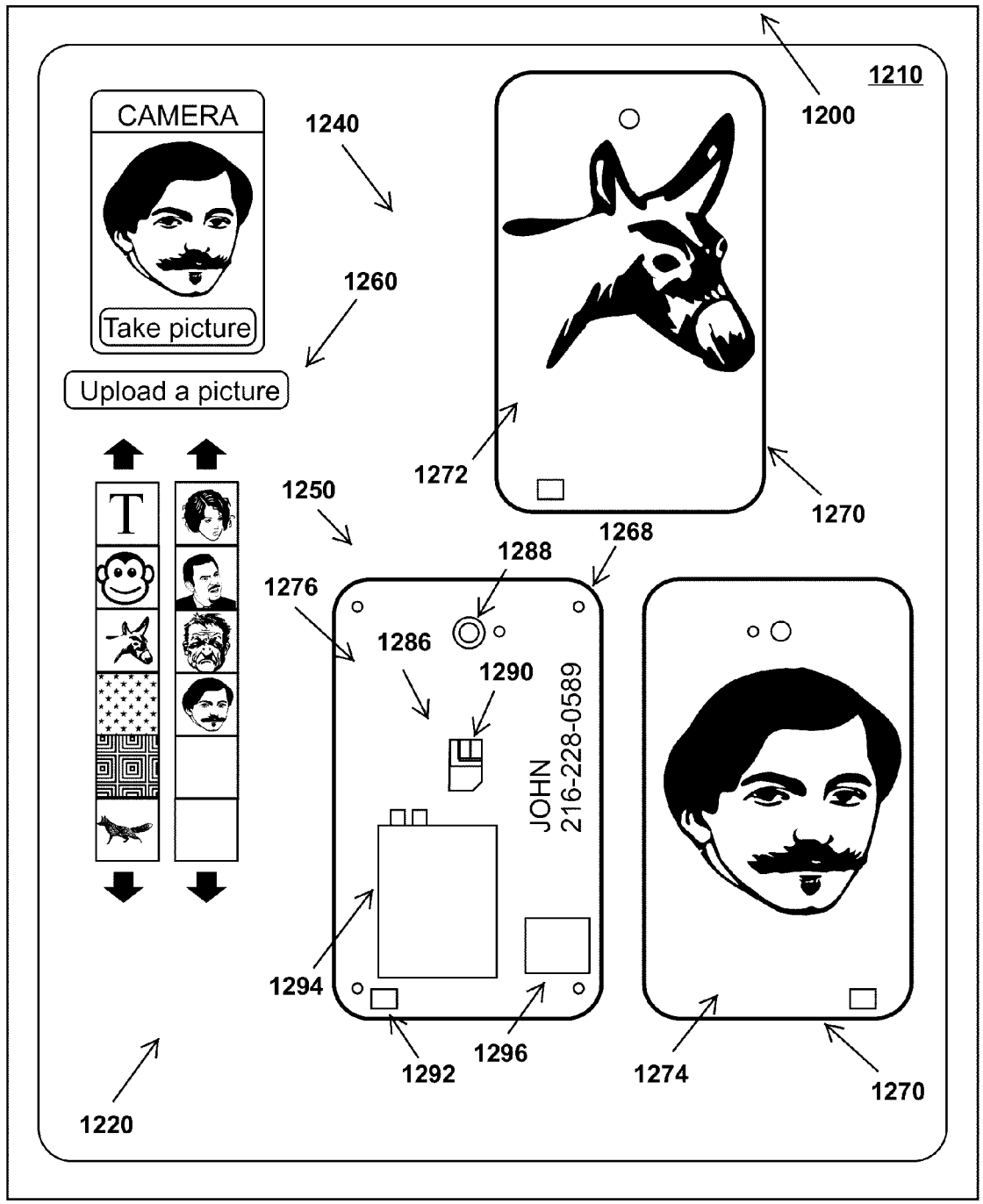
FIG. 12B is the electronic device of FIG. 12A with the display that shows the graphical user interface for designing a back-side of the body of the HPED in accordance with an example embodiment.

FIGS. 12A and 12B show an electronic device 1200 with a display 1210 that shows a graphical user interface 1220 for designing a front-side 1230 and a back-side 1240 of an HPED 1250. The GUI 1220 includes an image selector 1260 (such as the image selector 630 described in connection with FIGS. 6-8).

The image selector enables a user to design, select, and place images on the front-side 1230 and on the back-side 1240 of the HPED 1250. In FIG. 12A, the front-side 1230 of the HPED 1250 includes a front-side 1262 of a front cover 1260, a back-side 1264 of the front cover 1260, and a front-side 1266 of an internal body 1268. In FIG. 12B, the back-side 1240 of the HPED 1250 includes a front-side 1272 of a back cover 1270, a back-side 1274 of the back cover 1270, and a back-side 1276 of the internal body 1268.

Looking to FIG. 12A, the front cover 1260 is a display screen and is clear and/or translucent. An exterior perimeter 1280 of the front cover 1260 includes a user-selected pattern selected from the image selector 1260. User-selected text (shown as "Property of John") is included on the front cover 1260, such as being lightly etched in the glass of the display. The front-side 1266 of the internal body 1268 includes electronic components 1282 that are beneath the front cover 1260.

Looking to FIG. 12B, the back cover 1270 is made of hard non-translucent plastic. The front-side 1272 and the back-side 1274 of the back cover 1270 include user-selected images selected from the image selector 1260. User-selected text (shown as "John 216-228-0589") is included on the back-side 1276 of the internal body 1268. This back-side also includes electronic components 1286, such as a camera 1288, a Subscriber Identity Module (SIM) card 1290, a speaker 1292, a battery 1294, and a secure digital (SD) card 1296. The text on the back-side 1276 can be included on an electronic component or formed on an exterior surface of a chassis of the HPED.

Different techniques can be used to apply images to a non-pliable and/or non-foldable cover. These techniques include, but are not limited to, etching or laser etching, engraving or laser engraving, laminating, painting, debossing, embossing, and printing.

Consider an example in which a user buys an HPED at a website of an online store. While at the website, the user selects an option to have a custom designed cover for the HPED. The website provides the user with a GUI that enables the user to upload images to a front-side of a back cover for the HPED. The user also selects images and patterns for a border around the front cover. Additionally, the user writes text to personalize a back-side of the internal body with a name and address of the user to signify who owns the HPED. This name and address are permanently engraved in the back-side of the internal body. The user also selects other design options, such as a specific type of memory and processor for the HPED. A manufacturer of the HPED manufactures the customized HPED and ships it to the user.

Consider an example in which a user decides to replace a front and back cover of an HPED with personalized covers. The user downloads a mobile application to the HPED. This mobile application executes a GUI (such as a GUI shown in the figures), and the user designs a customized and personalized front and back cover. During the design of the back cover, the user takes a picture of herself with the HPED, and this picture is applied to the back cover. A third party manufacturer (i.e., a manufacturer other than the one that manufactured the HPED) applies the user designs to the covers and sends them to the user.

Consider an example in which a user enters a retail store in a shopping mall. The retail stores offers customized covers for HPEDs. A user selects designs from a library and applies these designs to both sides of front and back covers of an HPED. The user removes the covers from the HPED and gives them to the retail store. The retail store has a laser etching machine that applies the designs to the user's covers and gives the covers back to the user. The user then fits the custom designed covers back onto the HPED.

Figure 13:
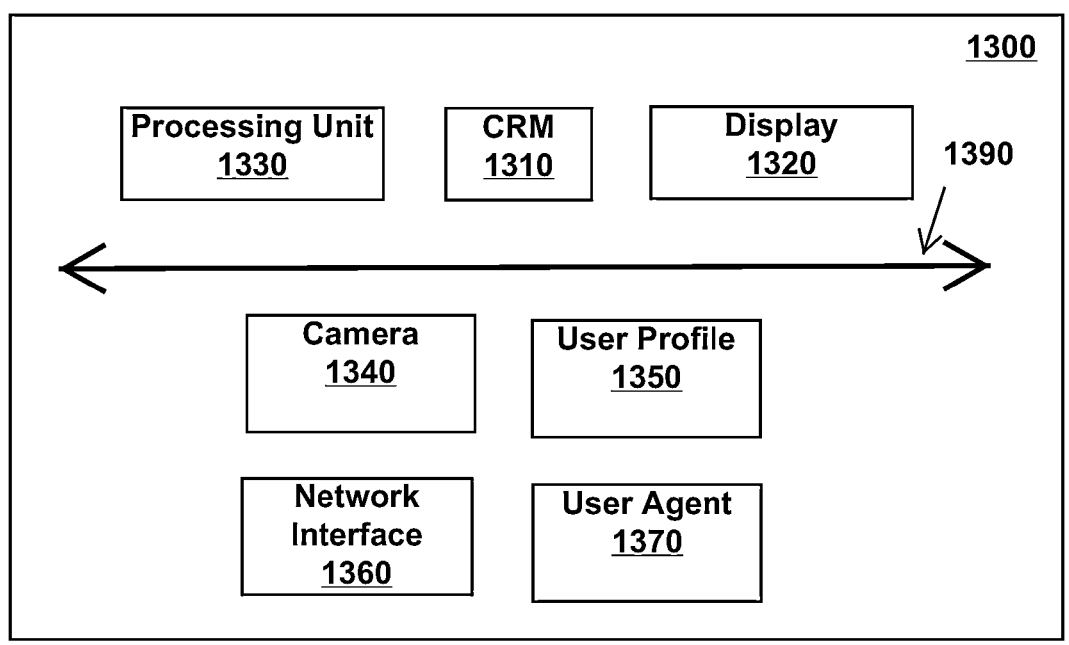
FIG. 13 is an electronic device in accordance with an example embodiment.

FIG. 13 is an electronic device 1300 in accordance with an example embodiment. The electronic device includes components of computer readable medium (CRM) or memory 1310, a display 1320, a processing unit 1330, a camera 1340, a user profile 1350, a network interface 1360, a user agent 1370, and one or more buses or communication paths 1390. FIG. 13 shows these components in a single electronic device. Alternatively, one or more of these components can be distributed or included in various electronic devices, such as some components being included in an HPED, some components being included in a server, some components being included in storage accessible over the Internet, and/or some components being in various different electronic devices that are spread across a network.

The processor unit 1330 includes a processor (such as a central processing unit, CPU, microprocessor, application-specific integrated circuit (ASIC), etc.) for controlling the overall operation of memory 1310 (such as random access memory (RAM) for temporary data storage, read only memory (ROM) for permanent data storage, and firmware). The processing unit 1330 communicates with memory 1310 and performs operations and tasks that implement one or more blocks of the flow diagrams discussed herein. The memory 1310, for example, stores applications, data, programs, algorithms (including software to implement or assist in implementing example embodiments) and other data.

The network interface 1360 provides a mechanism for the electrical device 1300 to communicate with other electrical devices, computers, or systems. For example, the network interface 1360 enables the electrical device to transmit data through a wired or wireless connection to a network, such as the Internet and/or a cellular network.

Blocks and/or methods discussed herein can be executed and/or made by a user, a user agent of a user, a software application, an electronic device, a computer, and/or a computer system. Furthermore, blocks and/or methods discussed herein can be performed without knowledge of the user and/or without instruction from the user. Consider an example in which a user is without knowledge of when an action occurs but has provided instruction for the action.

Consider an example in which the user has knowledge of an action but did not instruct the action. Consider an example in which a user agent of a user performs an action without the user having knowledge of the action and without the user providing the user agent with specific instruction to perform the action.

As used herein, a "template" is a pattern that serves as a guide to produce other things. For example, a printed template on a flat piece of paper serves as a pattern to fold the template into a cover for an HPED.

As used herein, a "user profile" is personal data that represents an identity of a specific person or organization. The user profile includes information pertaining to the characteristics and/or preferences of the user. Examples of this information for a person include, but are not limited to, one or more of personal data of the user (such as age, gender, race, ethnicity, religion, hobbies, interests, income, employment, education, etc.), photographs (such as photos of the user, family, friends, and/or colleagues), videos (such as videos of the user, family, friends, and/or colleagues), and user-specific data that defines the user's interaction with and/or content on an electronic device (such as display settings, application settings, network settings, stored files, downloads/uploads, browser activity, software applications, user interface or GUI activities, and/or privileges).

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed by a computer system to create a cover for a handheld portable electronic device (HPED), the method comprising:
   displaying, on a display, a template with a pattern that serves as a guide to fold the template and produce the cover such that the template is displayed as being marked with zones to display selected images;
   displaying, on the display and with the template, an image of the HPED with the cover that has surfaces to display the selected images;
   displaying, on the display and simultaneously with the template and the image of the HPED with the cover, an image selector that displays images that when selected appear as the selected images on the zones of the template and on the surfaces of the cover that is around the image of the HPED; and
   selecting, with the image selector, the selected images such that the selected images appear on the zones of the template and on the surfaces of the cover,
   wherein the template is printed with the selected images on the zones of the template and then folded according to the pattern to produce the cover that has a form factor of the HPED.

2. The method of claim 1 further comprising:
   displaying the template as a two-dimensional image;
   displaying the cover and the image of the HPED as a three-dimensional model that rotates, wherein the cover and the image of the HPED rotate about three axes to show different surfaces that includes images selected with the image selector.

3. The method of claim 1, wherein the cover includes an open end that receives an end of the HPED, includes a window that is sized and shaped to a size and shape of a display on the HPED, and fits around the HPED to provide a protective enclosure for the HPED.

4. The method of claim 1 further comprising:
   receiving a click on an image displayed by the image selector;
   receiving a click on a surface of the cover while the image of the HPED is inside the cover;
   displaying the image simultaneously on a zone of the template and on the surface of the cover that corresponds to the zone of the template.

5. The method of claim 1 further comprising:
   displaying, on the display, a text tool that writes text on a surface of the cover that surrounds the image of the HPED, wherein text written on the surface of the cover also appears on a corresponding zone of the template.

6. The method of claim 1 further comprising:
   capturing a picture of a person with a camera in the HPED;
   displaying, on the display and in real-time, the picture of the person to a surface of the cover that surrounds the image of the HPED when the picture is taken.

7. The method of claim 1 further comprising:
   displaying a picture simultaneously on a zone in the template and on a surface of the image of the HPED, wherein the zone of the template corresponds to the surface of the image of the HPED after the template is folded into the cover.

8. A system, comprising:
   a template that is formed of paper and that includes a pattern that serves as a guide to fold the template into a cover that encloses a handheld portable electronic device (HPED); and
   a computer with a display that simultaneously displays an image of the template with visibly marked zones that receive images, an image of the HPED that has surfaces corresponding to the zones of the template, and an image selecting tool with images that when selected appear on the zones of the template and on surfaces of the image of the HPED;
   wherein the template is printed with the images on the zones and then folded according to the pattern and glued together to form the cover;
   wherein the cover has a size and shape of the HPED and encloses outer surfaces of the HPED.

9. The system of claim 8, wherein the image of the HPED on the display shows what the HPED will look like when the images are printed on the template, the template is folded into the cover, and the HPED is placed in the cover.

10. The system of claim 8 further comprising:
    a piece of paper with a shipping address;
    a piece of cardboard that has a size and shape of the HPED;
    wherein the piece of cardboard is inserted into the cover to prevent the container from being damaged during shipping;
    wherein the piece of paper is folded around the cover to provide an envelope for shipping an assembly of the cover and the cardboard;
    wherein the assembly has a size and shape of the HPED.

11. The system of claim 8, wherein the template is printed with glow-in-the dark ink so the container glows in the dark when placed enclosed around the HPED.

12. The system of claim 8, wherein the template includes a see-through window that overlaps on a display of the HPED when the container encloses the HPED.

13. The system of claim 8, wherein an outer surface of the template includes a holographic image that appears on the container when the HPED is placed in the cover.

14. The system of claim 8, wherein the display displays a tool that selects different colors for the zones of the template, wherein a common color on a zone of the template and a zone of the image of the HPED indicates that the zone of the template and the zone of the image of the HPED correspond to each other.

15. A non-transitory computer readable storage medium storing instructions that cause a computer system to execute a method, comprising:
    display a three-dimensional image of a handheld portable electronic device (HPED) housed in a cover that has a size and shape of the HPED;
    display, with the image of the HPED in the cover, an image selector that displays pictures;
    display, simultaneously with the image of the HPED in the cover and with the image selector, a template that shows the cover in an unassembled state and that includes a pattern that serves as a guide to fold the template into the cover;

transfer, upon selection of the pictures with the image selector to the template, the pictures to a plurality of different outer surfaces of the cover in order to create a custom design for the cover, the pictures transferring to the cover while the template, the image of the HPED in the cover, and the image selector are displayed on the display; and print the pictures on the template made of pliable material, wherein the template is folded into the shape of the cover.

16. The non-transitory computer readable storage medium storing instructions of claim 15 further to cause the computer system to execute the method comprising:

uploading the pictures from a cloud;

displaying the pictures on the surfaces of the cover to indicate what the cover will look like after the pictures are printed on the template and the template is folded into the shape of the cover.

17. The non-transitory computer readable storage medium storing instructions of claim 15, wherein the outer surfaces of the cover include an area on a front of the cover, an area on two opposite sides of the cover, an area on a back of the cover, and an area on an inside surface of the cover, wherein the inside surface of the cover is hidden when the HPED is placed in the cover and visible when the HPED is removed from the cover.

18. The non-transitory computer readable storage medium storing instructions of claim 15 further to cause the computer system to execute the method comprising:

print symbols on the template to indicate where to fold the template into the shape of the cover;

print lines on the template to indicate where to place glue to secure the template together.

19. The non-transitory computer readable storage medium storing instructions of claim 15 further to cause the computer system to execute the method comprising:

receive, from the HPED, a picture of a person;

place the picture of the person on a designated outer surface of the cover that is designated for pictures of people;

receive, from the HPED, a picture of an object that is not a person;

place the picture of the object on a designated outer surface of the cover that is designated for pictures of objects that are not people.

20. The non-transitory computer readable storage medium storing instructions of claim 15, wherein the cover is formed of flashspun high-density polyethylene fibers.

\* \* \* \* \*